United States Patent
Na et al.

(10) Patent No.: US 9,640,809 B2
(45) Date of Patent: May 2, 2017

(54) ION FILTER ROOF STRUCTURE OF FUEL CELL FOR VEHICLE

(71) Applicants: Hyundai Motor Company, Seoul (KR); Kia Motors Corporation, Seoul (KR)

(72) Inventors: Sung Wook Na, Gyeonggi-do (KR); Hun Woo Park, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 65 days.

(21) Appl. No.: 14/716,103

(22) Filed: May 19, 2015

(65) Prior Publication Data
US 2016/0172691 A1  Jun. 16, 2016

(30) Foreign Application Priority Data
Dec. 12, 2014  (KR) .................. 10-2014-0179067

(51) Int. Cl.
*H01M 8/04* (2016.01)
*H01M 8/04007* (2016.01)

(52) U.S. Cl.
CPC .... *H01M 8/04074* (2013.01); *H01M 2250/20* (2013.01); *Y02T 90/32* (2013.01)

(58) Field of Classification Search
CPC .......... H01M 2250/20; H01M 8/04074; Y02T 90/32
USPC ........................................ 429/435
See application file for complete search history.

(56) References Cited

U.S. PATENT DOCUMENTS

| | | | |
|---|---|---|---|
| 2002/0177022 A1* | 11/2002 | Shimonosono ... | H01M 8/04029 429/434 |
| 2009/0311565 A1 | 12/2009 | Ishikawa | |
| 2012/0045706 A1 | 2/2012 | Ishikawa | |
| 2012/0141890 A1* | 6/2012 | Seo .................... | H01M 8/04201 429/414 |
| 2013/0295478 A1* | 11/2013 | Han .................. | H01M 8/04417 429/428 |

FOREIGN PATENT DOCUMENTS

| | | |
|---|---|---|
| KR | 10-0614452 B1 | 8/2006 |
| KR | 10-0967686 B1 | 7/2010 |
| KR | 10-2012-0032282 A | 4/2012 |
| KR | 10-1163464 B1 | 7/2012 |
| KR | 10-2013-0011631 A | 1/2013 |

* cited by examiner

*Primary Examiner* — Jonathan Jelsma
*Assistant Examiner* — Omar Kekia
(74) *Attorney, Agent, or Firm* — Mintz Levin Cohn Ferris Glovsky and Popeo, P.C.; Peter F. Corless

(57) ABSTRACT

An ion filter roof structure of a fuel cell for a vehicle is provided and includes a controller that is connected to a heater, a pump, a 4-way valve, and a radiator disposed within a fuel cell for a vehicle. In addition, a thermal management system of the ion filter roof structure includes an ion filter and a fuel cell stack connected to the controller to form an ion filter roof. Based on this structure, during high output, a cooling performance of the vehicle is improved, durability of the ion filter is improved, and a pump operation is decreased to improve fuel efficiency.

10 Claims, 8 Drawing Sheets

ION FILTER ROOF STRUCTURE OF FUEL CELL FOR VEHICLE

CROSS-REFERENCE TO RELATED APPLICATION

This application is based on and claims the benefit of priority to Korean Patent Application No. 10-2014-0179067, filed on Dec. 12, 2014 in the Korean Intellectual Property Office, the disclosure of which is incorporated herein in its entirety by reference.

TECHNICAL FIELD

The present disclosure relates to an ion filter roof structure of a fuel cell for a vehicle, and more particularly, to an ion filter roof structure of a fuel cell for a vehicle, that improves a heat radiation performance of the fuel cell for a vehicle by operating the ion filter roof of a 4-way valve.

BACKGROUND

In general, a fuel cell is a type of device configured to generate electricity by electrochemically reacting chemical energy of the fuel in a fuel cell stack to be converted into electrical energy. The fuel cell supplies a power for industry, family use, and for driving a vehicle, and is applied to an electric/electronic product having a substantially small size, and recently, has been applied to a vehicle.

A fuel cell system disposed within the vehicle includes a fuel cell stack configured to generate an electrical energy, a fuel supplying device configured to supply a fuel (hydrogen) to the fuel cell stack, an air supplying device configured to supply oxygen in air which is an oxidizer required for an electrochemical reaction, to the fuel cell stack, a thermal management system (TMS) configured to remove reaction heat of the fuel cell stack to be discharged to the exterior of the system and adjust an operation temperature of the fuel cell stack In the fuel cell system having the above-described configuration, electricity is generated by the electrochemical reaction using the hydrogen which is the fuel and the oxygen in the air, and water and heat are discharged as reaction by-products.

Since the heat is generated as the reaction by-product in the fuel cell system, a device for cooling the stack is essential to prevent an increase in temperature of the stack In addition, since the fuel cell system is used to maintain cold engine start properties, the thermal management system (TMS) is significantly important. It is well known in the art that cooling water of a TMS line serves as a cooling medium which cools the stack and simultaneously serves as a heating medium which performs rapid thawing on the stack to thereby be rapidly heated by a heater to be supplied to the stack during the cold engine start.

Since some of the cooling water always flows in the existing fuel cell for a vehicle, flow loss occurs, and therefore, during hot weather, an amount of the cooling water is insufficient, and as a result, there is a limitation in a current in a vehicle due to the cooling water at a high temperature which decreases an output, such that fuel efficiency is deteriorated.

SUMMARY

The present disclosure provides an ion filter roof structure of a fuel cell for a vehicle that may improve a heat radiation performance of the fuel cell for a vehicle by operating the ion filter roof of a 4-way valve.

According to an exemplary embodiment of the present disclosure, an ion filter roof structure of a fuel cell for a vehicle may include: a controller configured to be connected to a heater, a pump, a 4-way valve, and a radiator disposed within a fuel cell for a vehicle; and a thermal management system configured to include an ion filter and a fuel cell stack connected to the controller to form an ion filter roof.

A flow rate of cooling water at a low temperature may be adjusted by the ion filter roof.

The thermal management system may be in communication with the 4-way valve to adjust the flow rate of the cooling water at the low temperature of the ion filter roof in real time. The 4-way valve may include: a body part disposed within the thermal management system; and a valve part rotatably provided with the body part to open or close a flow of cooling water at a low temperature or at a substantially high temperature. The valve part may include: a plurality of first apertures configured to introduce the cooling water at the low temperature or the high temperature; a second aperture configured to control a flow rate by opening or closing the ion filter roof; and a third aperture configured to discharge the mixed cooling water at the low temperature or the high temperature.

The first aperture may be formed lengthwise in a left and right direction to selectively introduce the cooling water at the low temperature or the high temperature based on a rotation of the valve part. The first aperture may be connected to the radiator and the fuel cell stack to introduce the cooling water at the low temperature or the high temperature. The second aperture may be formed lengthwise in a left and right direction to adjust a flow rate of the ion filter roof based on a rotation of the valve part. The second aperture may be connected to the ion filter roof. The third aperture may be disposed in a lower portion of the valve part to discharge the cooling water at the low temperature or the high temperature.

The ion filter roof may include: a roof configured to introduce the cooling water at the high temperature of the fuel cell stack and a flow of the ion filter; and a roof configured to introduce a flow of the radiator and the flow of the ion filter, based on a rotation amount of the 4-way valve. The first aperture may be connected to the radiator to operate the roof, and the second aperture may be connected to the ion filter to operate the roof.

BRIEF DESCRIPTION OF THE DRAWINGS

The above and other objects, features and advantages of the present disclosure will be more apparent from the following detailed description taken in conjunction with the accompanying drawings.

Figure 5:
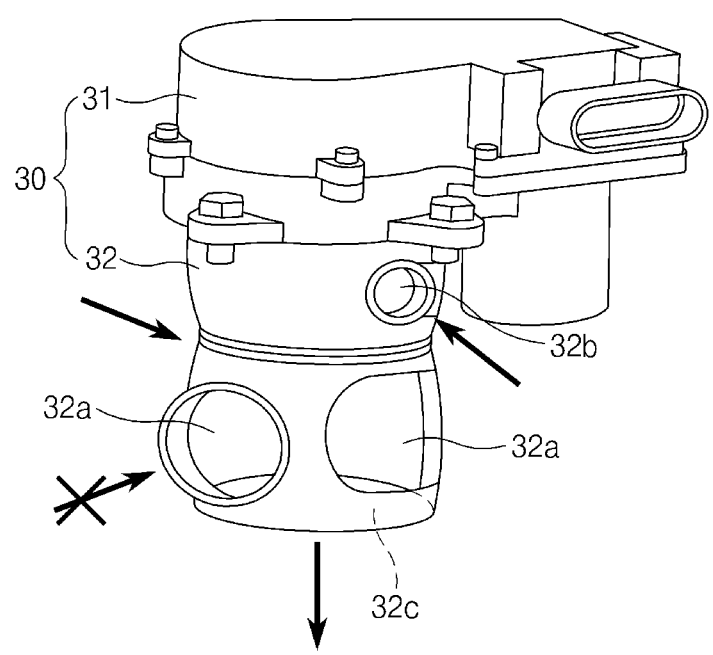
Figure 6:
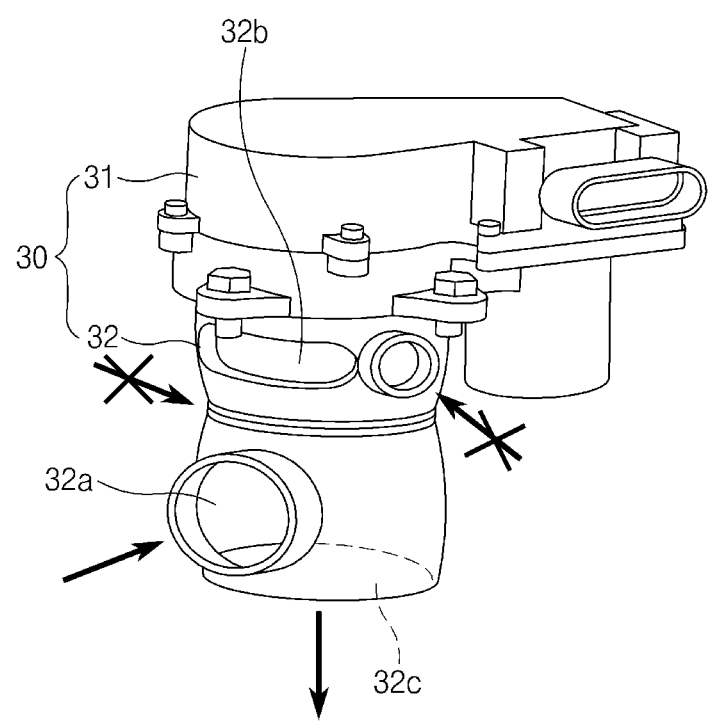
Figure 7:
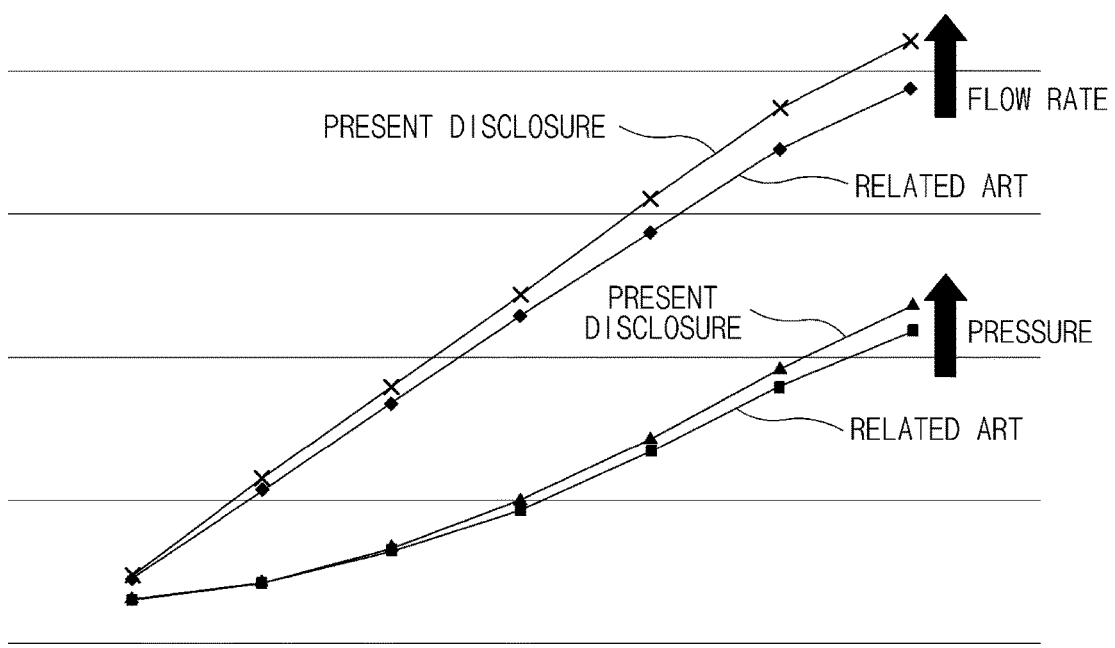
Figure 8:
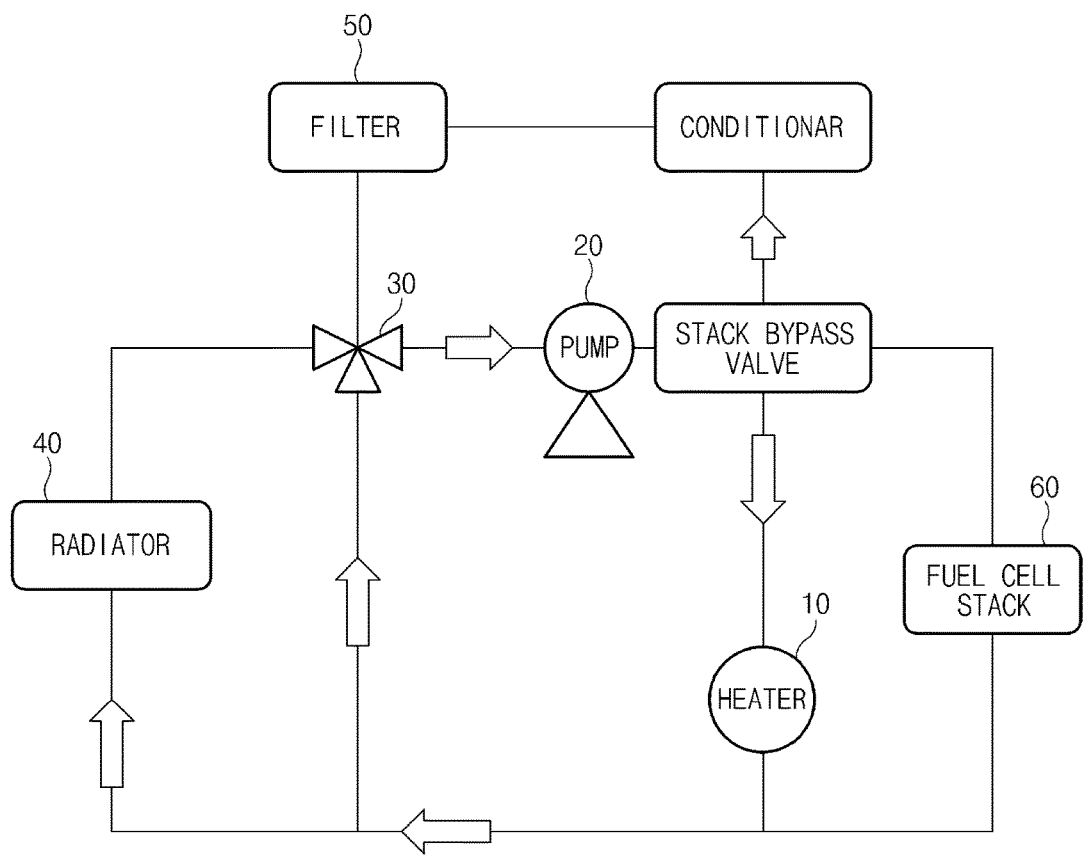

FIG. 5 shows an exemplary view of the valve part of the 4-way valve that rotates less 5 degrees in the ion filter roof structure of the fuel cell for a vehicle according to an exemplary embodiment of the present disclosure;

FIG. 6 shows an exemplary view of the valve part of the 4-way valve that rotates 110 degrees in the ion filter roof structure of the fuel cell for a vehicle according to an exemplary embodiment of the present disclosure;

FIG. 7 is an exemplary graph showing an effect of an ion filter roof structure of the fuel cell for a vehicle according to an exemplary embodiment of the present disclosure; and FIG. 8 is an exemplary configuration diagram of the ion filter roof structure of the fuel cell for a vehicle according to an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the tem controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings.

Figure 1:
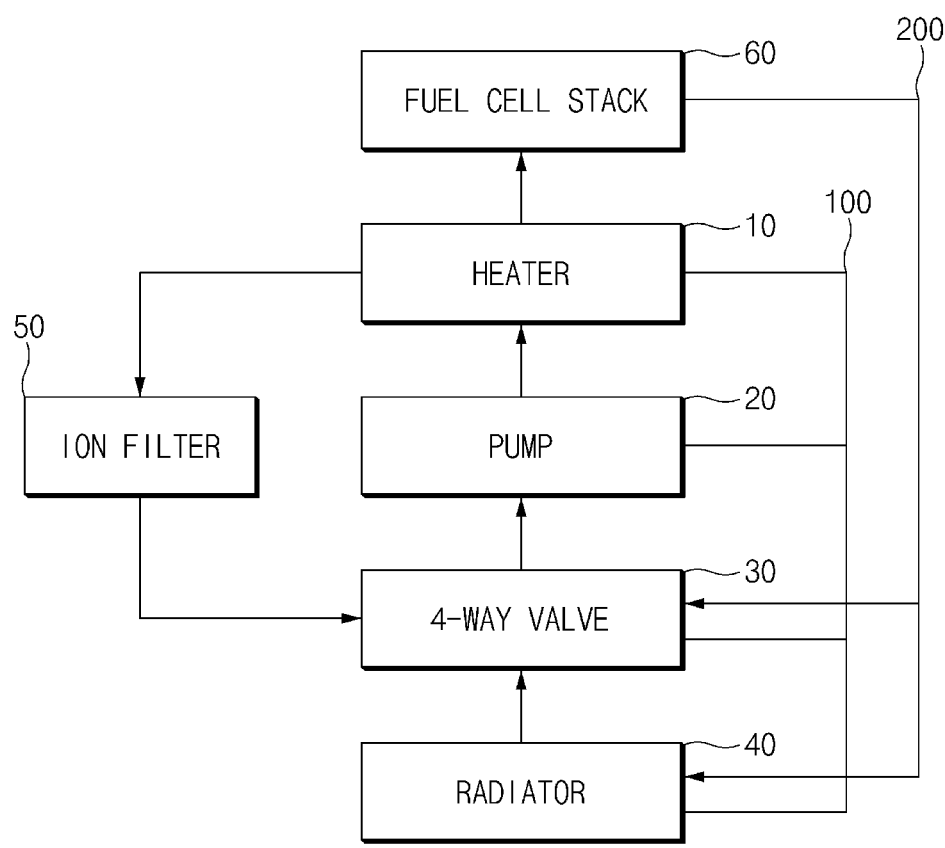
FIG. 1 is an exemplary configuration diagram of an ion filter roof structure of a fuel cell for a vehicle according to an exemplary embodiment of the present disclosure.
Figure 2:
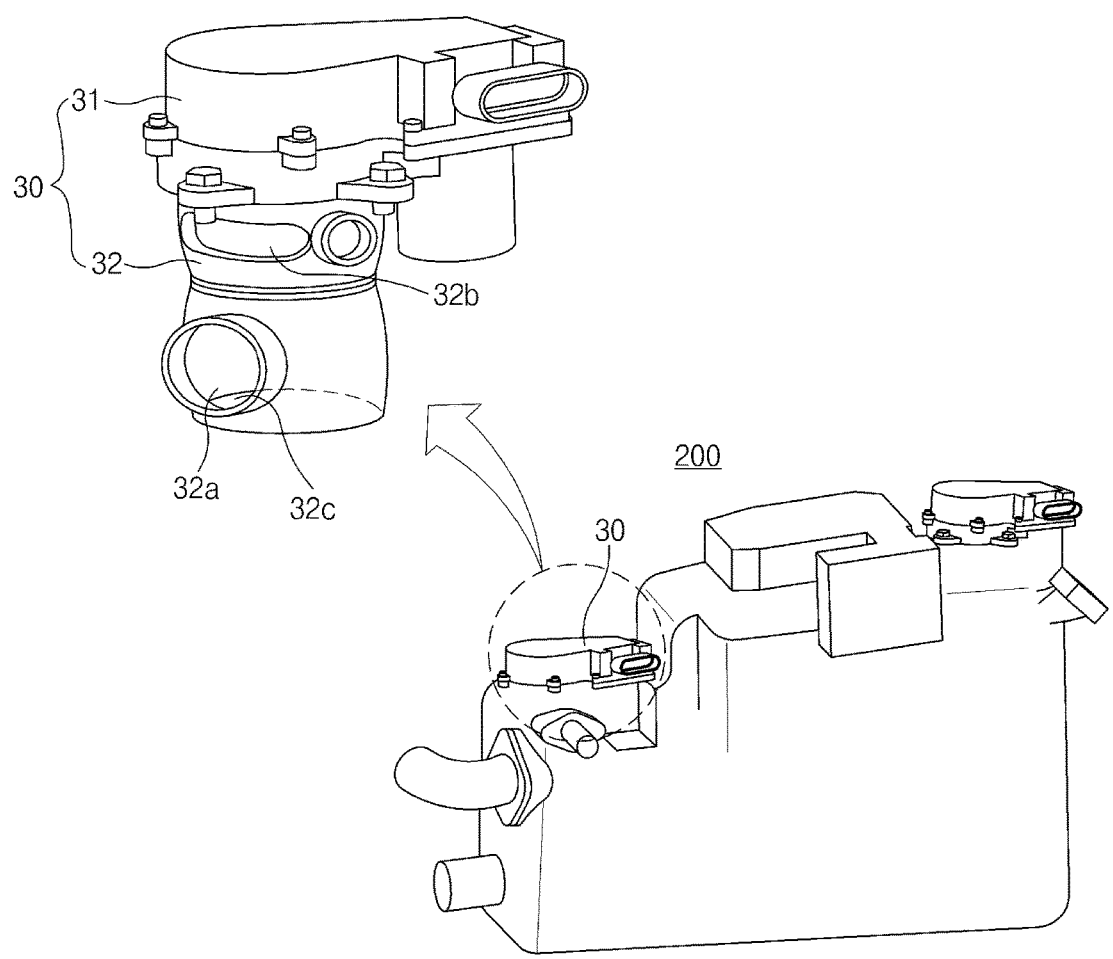
FIG. 2 shows an exemplary thermal management system to which the ion filter roof structure of the fuel cell for a vehicle according to an exemplary embodiment of the present disclosure is applied.

An ion filter roof structure of a fuel cell for a vehicle according to the present disclosure may include: a controller 100; and a thermal management system connected to the controller 100 to form an ion filter roof as shown in FIGS. 1 to 8. As shown in FIGS. 1 and 2, the controller 100 may connected to a heater 10, a pump 20, a 4-way valve 30, and a radiator 40 disposed within the fuel cell for a vehicle.

The thermal management system 110 may include a fuel cell stack 60 and an ion filter 50 connected to the controller 100 to form the ion filter roof (not shown). In other words, the ion filter roof structure of the fuel cell for a vehicle according to the present disclosure may include the controller 100 and the thermal management system 110 to form the ion filter roof (not shown) of the fuel cell for a vehicle, and the 4-way valve 30 may be connected to the ion filter 50, the radiator 40, and the fuel cell stack 60 to adjust a flow rate of a cooling water at a low temperature or a high temperature.

Particularly, the ion filter 50 may be connected to the 4-way valve 30 and the heater 10, and the pump 20 may be connected to the 4-way valve 30 and the heater 10, and the fuel cell stack 60 may be connected to the 4-way valve 30 and the radiator 40, which enables rotation, to provide the ion filter roof. In addition, the thermal management system 110 may be in communication with the 4-way valve 30 to adjust the flow rate of the cooling water at the low temperature of the ion filter roof in real time.

Meanwhile, the real-time adjustment of the flow rate of the cooling water at the low temperature of the ion filter roof may be performed by the 4-way valve 30 in the present disclosure, and a description thereof is as follows. As shown in FIGS. 2 to 6, the 4-way valve 30 may include a body part 31 disposed within the thermal management system 110; and a valve part 32 rotatably provided with the body part 31 to open or close a flow of cooling water at a low temperature or at a high temperature.

In particular, the valve part 32 may include a plurality of first apertures 32a configured to introduce the cooling water at the low temperature or the high temperature; a second aperture 32b configured to adjust a flow rate by opening or closing the ion filter roof; and a third aperture 32c configured to discharge the mixed cooling water at the low temperature or the high temperature.

Meanwhile, the plurality of first apertures 32a may be formed lengthwise in a left and right direction to face each other, to introduce either the cooling water at the high temperature or at the low temperature or the cooling water at the low temperature and the cooling water at the high temperature may be introduced simultaneously based on a rotation of the valve part 32.

Further, one of the first apertures 32a may be connected to the radiator 40 to introduce the cooling water at the low temperature, and another one of the first apertures 32a may be connected to the fuel cell stack 60 to introduce the cooling water at the high temperature. In addition, the second aperture 32b may be formed lengthwise in the left and right direction to adjust the flow rate of the ion filter roof based on the rotation of the valve part 32.

Accordingly, the second aperture 32b may be connected to the ion filter roof. In particular, the ion filter roof may include a first roof configured to introduce the cooling water at the high temperature of the fuel cell stack 60 and a flow of the ion filter 50; and a second roof configured to introduce a flow of the radiator 40 and the flow of the ion filter 50, based on a rotation amount of the 4-way valve 30, as shown in FIG. 8. In addition, the first aperture 32a may be connected to the radiator 40 to operate the first roof, and the second aperture 32b may be connected to the ion filter 50 to operate the second roof. The third aperture 32c may be disposed in a lower portion of the valve part 32 to discharge the cooling water at the low temperature or the high temperature.

Figure 3:
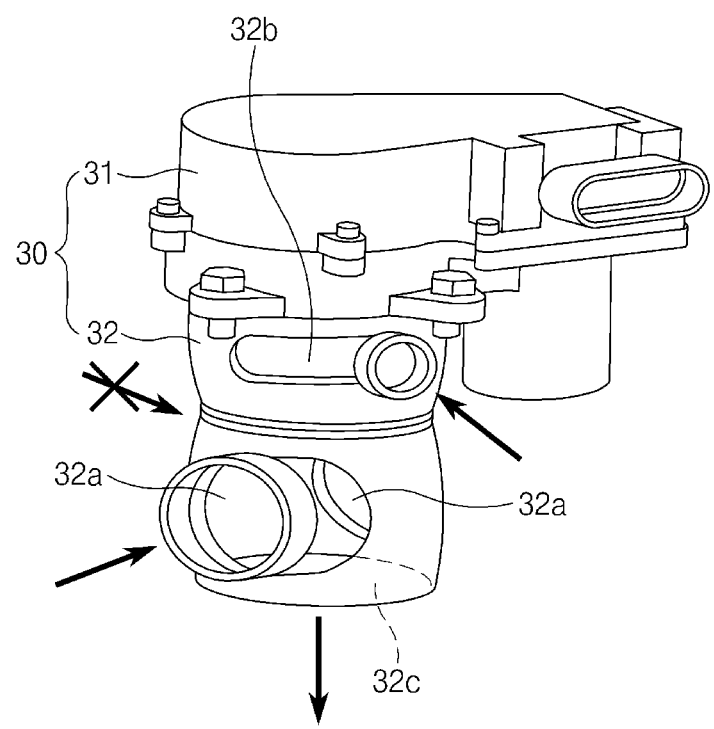
FIG. 3 shows an exemplary view of a valve part of a 4-way valve that rotates 80 degrees in the ion filter roof structure of the fuel cell for a vehicle according to an exemplary embodiment of the present disclosure.

Meanwhile, the valve part 32 may be configured to rotate from less than about 5 degrees up to about 110 degrees to introduce or discharge the cooling water at the low temperature or the cooling water at the high temperature (e.g., introduce the cooling water when less than about 5 degrees and discharge when rotated up to about 110 degrees). In the previous description, the rotation of the valve part 32 is limited in view of an angle for specific explanation. However, the rotation degrees may vary in examples. In other words, in the present disclosure, when the valve part 32 rotates about 80 degrees, the first aperture 32a may be connected to the radiator 40 and may be configured to close a connection with the fuel cell stack 60, to introduce only the cooling water at the low temperature and the cooling water at the high temperature may be blocked from being introduced, as shown in FIG. 3. The second aperture 32b may be connected to the ion filter roof in this configuration.

Figure 4:
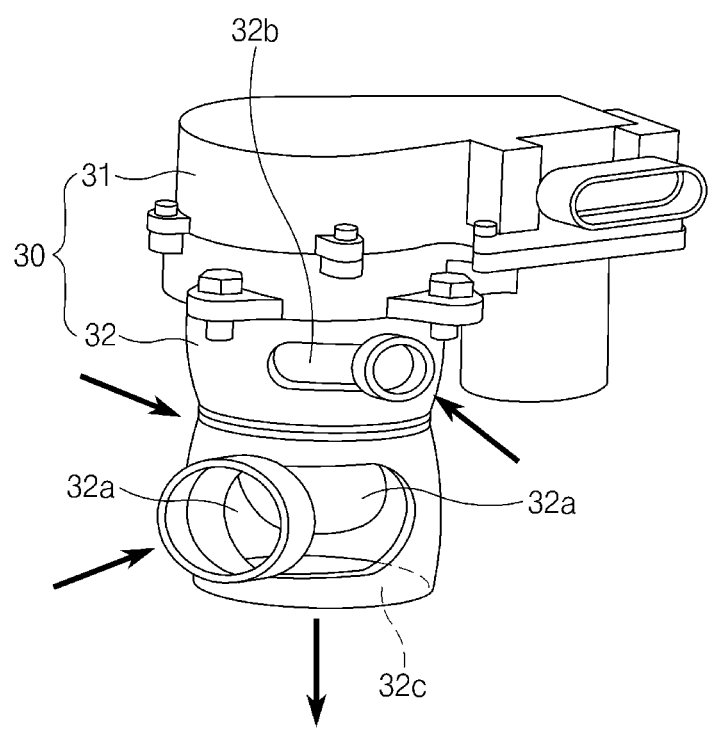
FIG. 4 shows an exemplary view of the valve part of the 4-way valve that rotates 5 degrees or greater to less 80 degrees in the ion filter roof structure of the fuel cell for a vehicle according to an exemplary embodiment of the present disclosure.

In addition, when the valve part 32 rotates about 5 degrees or greater to below about 80 degrees, the first aperture 32a may be connected to both of the radiator 40 and the fuel cell stack 60, to simultaneously introduce the cooling water at the low temperature and the cooling water at the high temperature, thereby adjusting temperature, as shown in FIG. 4. In this configuration, the second aperture 32b may be connected to the ion filter roof.

Further, when the valve part 32 rotates approximately 5 degrees, the first aperture 32a may be configured to close the connection with the radiator 40 and maintain the connection with the fuel cell stack 60, to block the cooling water at the low temperature from being introduced, and allowing the cooling water at the high temperature to be introduced as shown in FIG. 5, which becomes a raising-temperature section at the beginning of the start-up of the vehicle. In this configuration, the second aperture 32b may be connected to the ion filter roof.

Meanwhile, when the valve part 32 rotates approximately 110 degrees, the first aperture 32a may be connected to the radiator 40 and may be configured to close the connection with the fuel cell stack 60, to introduce only the cooling water at the low temperature and block the cooling water at the high temperature from being introduced, and the second aperture 32b may be configured to block the connection with the ion filter roof to increase a flow of a cooling system for a vehicle, such that an insufficient amount of heat radiation may be secured.

As described above, the ion filter roof structure of the fuel cell for a vehicle according to the present disclosure may include: the controller 100 connected to the heater 10, the pump 20, the 4-way valve 30, and the radiator 40 disposed within the fuel cell for a vehicle; and the thermal management system 110 may include the ion filter 50 and the fuel cell stack 60 connected to the controller 100 to form the ion filter roof, such that as compared to the related art, the flow rate of the cooling water at the low temperature may be improved to provide improved cooling performance of the system, and the time for maintaining an operation with a maximum output may be increased to provide improved commercial value and improved fuel efficiency, as shown in FIG. 7.

As set forth above, according to the exemplary embodiments of the present disclosure, it may be possible to improve a cooling performance of the vehicle, to improve durability of the ion filter, and to decrease a pump operation to thereby provide improved fuel efficiency during high output.

Although the present disclosure has been described with reference to exemplary embodiments and the accompanying drawings, it would be appreciated by those skilled in the art that the present disclosure is not limited thereto but various modifications and alterations might be made without departing from the idea of the present disclosure and the scope defined in the claims.

What is claimed is:

1. An ion filter roof structure of a fuel cell vehicle, comprising:
   a controller connected to a heater, a pump, a 4-way valve, and a radiator disposed within the fuel cell vehicle; and
   a thermal management system that includes an ion filter and a fuel cell stack connected to the controller to form the ion filter roof,
   wherein the 4-way valve includes:
      a body part disposed within the thermal management system; and
      a valve part rotatably provided with the body part to open or close a flow of cooling water at a low temperature or at a high temperature, and
   wherein the valve part includes:
      a plurality of first apertures configured to introduce the cooling water at the low temperature or the high temperature;
      a second aperture configured to adjust a flow rate by opening or closing the ion filter roof; and
      a third aperture configured to discharge the mixed cooling water at the low temperature or the high temperature.

2. The ion filter roof structure according to claim 1, wherein a flow rate of cooling water at a low temperature is adjusted by the ion filter roof.

3. The ion filter roof structure according to claim 2, wherein the thermal management system is in communication with the 4-way valve to adjust the flow rate of the cooling water at the low temperature of the ion filter roof in real time.

4. The ion filter roof structure according to claim 1, wherein each of the first apertures is formed lengthwise in a left and right direction to selectively introduce the cooling water at the low temperature or the high temperature based on a rotation of the valve part.

5. The ion filter roof structure according to claim 4, wherein each of the first apertures is connected to the radiator and the fuel cell stack to introduce the cooling water at the low temperature or the high temperature.

6. The ion filter roof structure according to claim 1, wherein the second aperture is formed lengthwise in a left and right direction to adjust a flow rate of the ion filter roof based on a rotation of the valve part.

7. The ion filter roof structure according to claim 6, wherein the second aperture is connected to the ion filter roof.

8. The ion filter roof structure according to claim 1, wherein the third aperture is disposed in a lower portion of the valve part to discharge the cooling water at the low temperature or the high temperature.

9. The ion filter roof structure according to claim 1, wherein the ion filter roof includes:
   a first roof configured to introduce the cooling water at the high temperature of the fuel cell stack and a flow of the ion filter; and a second roof configured to introduce a flow of the radiator and the flow of the ion filter, based on a rotation amount of the 4-way valve.

10. The ion filter roof structure according to claim 9, wherein each of the first apertures is connected to the radiator to operate the first roof, and the second aperture is connected to the ion filter to operate the second roof.

\* \* \* \* \*